United States Patent
Nusier et al.

(10) Patent No.: US 9,660,234 B2
(45) Date of Patent: May 23, 2017

(54) BATTERY ENCLOSURE WITH ARC-SHAPED ELONGATED IMPACT ABSORBING RIBS

(71) Applicant: Ford Global Technologies, LLC, Dearborn, MI (US)

(72) Inventors: Saied Nusier, Canton, MI (US); William L. Stanko, Canton, MI (US); Saeed David Barbat, Novi, MI (US); Mohamed Ridha Baccouche, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 51 days.

(21) Appl. No.: 14/619,244

(22) Filed: Feb. 11, 2015

(65) Prior Publication Data
US 2016/0233464 A1    Aug. 11, 2016

(51) Int. Cl.
*H01M 2/10* (2006.01)
*H01M 2/34* (2006.01)

(52) U.S. Cl.
CPC ....... *H01M 2/1072* (2013.01); *H01M 2/1094* (2013.01); *H01M 2/347* (2013.01); *H01M 2220/20* (2013.01)

(58) Field of Classification Search
CPC .............. B60K 1/04; B60K 2001/0438; B60L 11/1877; B60R 19/42; B60Y 2306/01; B62D 21/15; H01M 2220/20; H01M 2/1083; H01M 2/1094
See application file for complete search history.

(56) References Cited

U.S. PATENT DOCUMENTS

| | | | |
|---|---|---|---|
| 2,671,599 A | 3/1954 | Price | |
| 5,156,225 A | 10/1992 | Murrin | |
| 6,279,300 B1 * | 8/2001 | Simhaee | B29C 51/225 53/453 |
| 6,300,005 B1 | 10/2001 | Kump | |
| 7,572,550 B2 | 8/2009 | Saito et al. | |
| 8,573,647 B2 | 11/2013 | Enning | |
| 8,632,902 B2 | 1/2014 | Wendorf et al. | |
| 8,702,161 B2 | 4/2014 | Charbonneau et al. | |
| 2003/0124315 A1 * | 7/2003 | Grochoski | B32B 3/12 428/180 |

(Continued)

FOREIGN PATENT DOCUMENTS

| | | |
|---|---|---|
| CN | 102593399 A | 7/2012 |
| CN | 103000835 | 3/2013 |

(Continued)

OTHER PUBLICATIONS

Dr. Lothar Wech, et al., Crash Safety Aspects of HV Batteries for Vehicles, Paper No. 11-0302 , 2011.

*Primary Examiner* — Patrick Ryan
*Assistant Examiner* — Ben Lewis
(74) *Attorney, Agent, or Firm* — Jason Rogers; Brooks Kushman P.C.

(57) ABSTRACT

An enclosure for a traction motor battery of a vehicle is disclosed that includes a plurality of impact absorbing members on the exterior of the enclosure. The impact absorbing members have an arc-shaped or partially cylindrical wall and a flat wall that define a partially cylindrical pocket. In an impact, the arc-shaped wall collapses toward the flat wall to absorb the impact force.

13 Claims, 5 Drawing Sheets

(56) References Cited

U.S. PATENT DOCUMENTS

| | | |
|---|---|---|
| 2008/0124625 A1 | 5/2008 | Hock et al. |
| 2012/0121946 A1 | 5/2012 | Eckstein et al. |
| 2012/0183828 A1 | 7/2012 | van den Akker |
| 2014/0287297 A1 | 9/2014 | Reitzle et al. |

FOREIGN PATENT DOCUMENTS

| | | | | |
|---|---|---|---|---|
| CN | 203434226 U | 2/2014 | | |
| CN | 103730616 A | 4/2014 | | |
| DE | 102008059941 A1 | 6/2010 | | |
| DE | 102009053138 A1 | 5/2011 | | |
| DE | 102010024320 A1 | 12/2011 | | |
| DE | 102010043899 A1 | 5/2012 | | |
| DE | 102010050826 A1 | 5/2012 | | |
| DE | 102011120960 A1 | 4/2013 | | |
| DE | 102011118284 A1 | 5/2013 | | |
| DE | 102011120010 A1 | 6/2013 | | |
| DE | 102012012294 A1 | 12/2013 | | |
| DE | 102012015919 A1 | 2/2014 | | |
| ES | 2396407 A2 | 2/2013 | | |
| GB | 2186253 | * | 8/1987 | ............ B32B 27/06 |
| KR | 100210949 B1 | 7/1999 | | |
| TW | 201421776 | 6/2014 | | |
| WO | 2012025166 | 3/2012 | | |
| WO | 2012073439 A1 | 6/2012 | | |
| WO | 2013079080 A1 | 6/2013 | | |
| WO | 2013156732 | 10/2013 | | |
| WO | 2013180611 A1 | 12/2013 | | |
| WO | 2014034020 | 3/2014 | | |

* cited by examiner

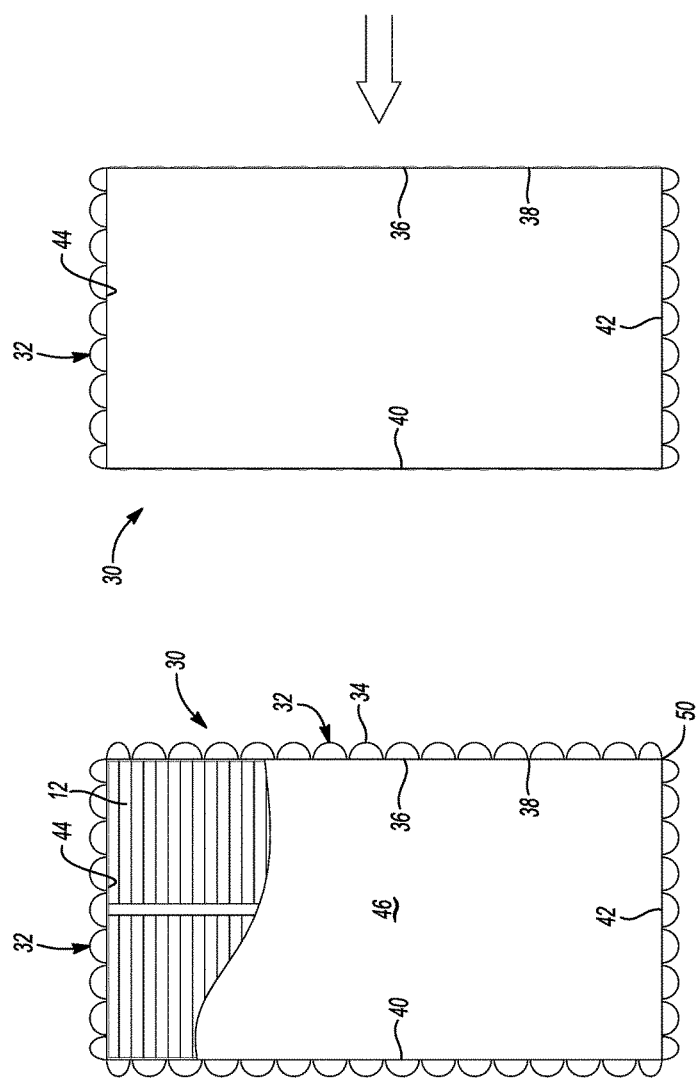

BATTERY ENCLOSURE WITH ARC-SHAPED ELONGATED IMPACT ABSORBING RIBS

TECHNICAL FIELD

This disclosure relates to protective structures for battery enclosures for electric vehicle batteries.

BACKGROUND

Electric vehicles use batteries that are enclosed in an enclosure or housing that is assembled to the vehicle body. The battery may be assembled to the vehicle body at a location that is spaced from the front, rear and sides of the vehicle. For example, the battery may be assembled below the passenger compartment, in the trunk, in front of the passenger compartment or in a longitudinally extending tunnel.

The battery must be protected from damage in a collision. The battery housing may be tightly packed with lithium ion battery packs or other types of battery cells. Deformation of the battery housing is to be avoided to prevent intrusion of the housing into the area housing the battery cells. Intrusions into the battery housing may rupture of battery cells and spill the contents of the battery cells.

When the battery housing is assembled in a central location in the vehicle, e.g. beneath the passenger compartment, limited crush space is available between the side of the vehicle body and the battery enclosure. More crush space is available between the battery enclosure and the front or rear ends of the vehicle. In either situation, there is a long felt and unfulfilled need for an efficient and effective lightweight structure for absorbing energy from a collision that minimizes battery enclosure deformation. The structure must have limited package space requirements while providing added stiffness to the battery enclosure assembly including the impact absorbing structure.

Some approaches to protecting the battery enclosure have proposed adding beams and cross members on the battery enclosure or extending outboard of the battery enclosure. These approaches add weight to the vehicle and require additional space to package the beams and cross members. Added weight is to be avoided because added weight adversely affects fuel economy. Increasing packaging space adversely affects vehicle design freedom.

The above problems and other problems are addressed by this disclosure as summarized below.

SUMMARY

According to one aspect of this disclosure, an enclosure for a battery is disclosed that comprises a plurality of side walls disposed about the battery that each included a plurality of arc-shaped outer wall segments and a flat inner wall that define a plurality of enclosed semi-cylindrical pockets.

According to other aspects of this disclosure, each of the sidewalls may include arc-shaped outer walls and the flat inner wall that are provided as a one-piece unitary structure. The side walls may include arc-shaped outer walls and the flat inner wall that are a one piece extruded structure. The arc-shaped outer walls absorb an impact applied to the enclosure by deforming as the arc-shaped outer walls collapse towards the flat inner wall.

The arc-shaped outer walls are partial cylinders that are generated about an axis that extends vertically. The arc-shaped outer walls may be half cylinders that are generated about an axis that extends vertically. Alternatively, the arc-shaped outer walls may be partial cylinders. An impact applied to the arc-shaped outer walls initially causes the arc-shaped outer walls to form a flat face extending between two side edges that extend substantially in a direction normal to the flat inner wall.

Impacts applied to the arc-shaped outer walls may continue to be absorbed by driving the flat face into engagement with the flat inner wall. The impact applied to the arc-shaped outer walls may continue to be absorbed by crushing the two side edges to collapse toward the flat inner wall. The arc-shaped outer wall segments are preferentially crushed prior to any deformation of the flat inner wall.

According to another aspect of this disclosure, a method is disclosed for providing an impact absorbing battery enclosure for a battery of a vehicle having a battery powered traction motor. The method comprises providing a plurality of vertically extending sides that each have a planar wall and a plurality of impact absorbing arc-shaped walls spaced from the planar walls that define a plurality of partially cylindrical pockets. The method also includes assembling the plurality of vertically extending sides together about the battery to form an impact absorbing assembly outside the battery.

Other aspects of the method may further comprise the step of extruding the vertically extending sides to form the planar wall and the plurality of arc-shaped walls. The vertically extending sides may be formed from an aluminum alloy. The vertically extending sides may be separately formed and assembled together at four corners of the enclosure.

The above aspects of this disclosure and other aspects will be described below with reference to the attached drawings.

BRIEF DESCRIPTION OF THE DRAWINGS

FIG. 4 is a top plan view of the battery enclosure shown in FIG. 2.

FIG. 5 is a top plan view of the battery enclosure shown in FIG. 2 after absorbing an impact in the fore/aft direction.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figures 1, 3:
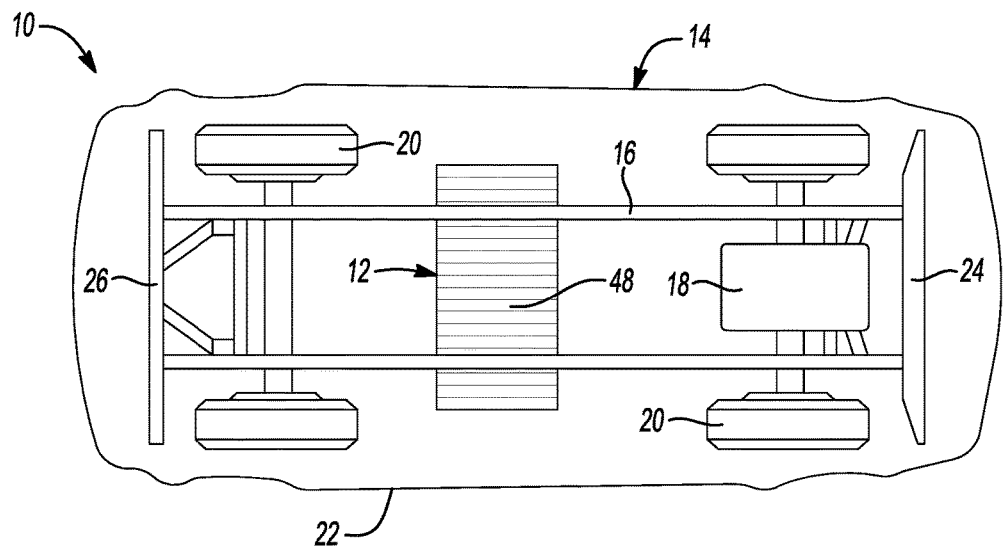
FIG. 1 is a diagrammatic bottom plan view of a vehicle illustrating a battery enclosure disposed on the vehicle frame beneath the passenger compartment.
FIG. 3 is a fragmentary perspective view of the battery enclosure shown in FIG. 2.

Referring to FIG. 1, a vehicle 10 is diagrammatically illustrated with a battery 12 for a battery-powered traction motor. The vehicle 10 includes a body 14 that is supported on a frame 16. A traction motor 18 is also assembled to the frame 16. The traction motor 18 is a battery-powered traction motor that is powered by the battery 12 to drive the wheels 20. The body 14 includes a side body 22, a front bumper 24 and a rear bumper 26. The battery 12 is shown to be centrally located underneath the passenger compartment of the vehicle 10. It should be noted that there is a substantially greater amount of space between the battery and the front and rear bumper 24 and 26 compared to the relatively closer spacing of the side body 22 to the battery 12. Side impact collisions that result in driving the side body 22 toward the battery 12 present a greater challenge when designing impact absorbing elements for the battery 12 due to the reduced amount of crush space available between the side body 22 and the battery 12.

Figure 2:
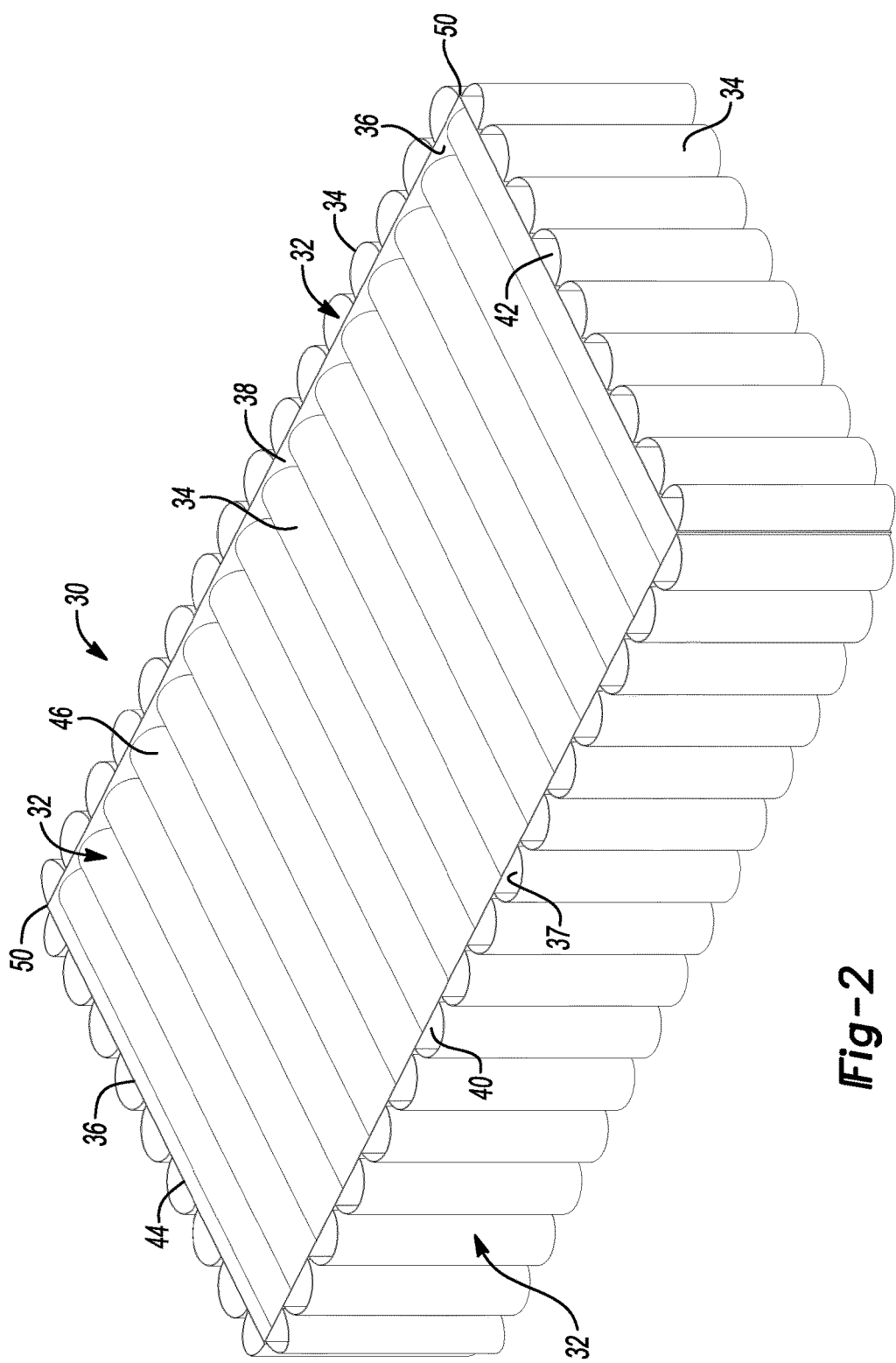
FIG. 2 is a perspective view of a battery enclosure including semi-cylindrical impact absorbing members provided on the sides and top of the enclosure.

Referring to FIGS. 2 and 3, a battery enclosure 30 is illustrated that is generally indicated by reference numeral 30. The battery enclosure 30 is enclosed by a plurality of partially cylindrical impact absorbing members 32. The impact absorbing members 32 include an arc-shaped outer wall 34 that is generated about an axis A shown in FIG. 3. The impact absorbing members 32 also include a flat inner wall 36. The arc-shaped outer wall 34 is joined to the flat inner wall 36 at its two opposite ends and forms a partially cylindrical pocket 37.

The arc-shaped outer wall 34 and flat inner wall 36 are preferably formed in an extrusion operation. The battery enclosure may be assembled around the battery 12 and includes a front wall 38 on a front portion of the battery enclosure 30, and a rear wall 34 on a rear portion of the battery enclosure 30. A right side wall 42 and a left side wall 44 are provided on the right and left sides of the enclosure 30. A top wall 46 is illustrated in FIGS. 2 and 3 that encloses the top surface of the battery enclosure 30. It should be understood that a bottom wall (not shown) in FIGS. 2 and 3, but is visible in FIG. 1. The walls 38-44 are joined at corners 50 if the battery enclosure 30 is formed as a plurality of walls that are joined together about the battery 12. It should also be understood that the four walls could conceivably be extruded at the same time, but such an extrusion would be too large for most enclosure designs. The top wall 46 and bottom wall 48 are assembled to the top and bottom surfaces of the battery.

Referring to FIGS. 4 and 5, the battery enclosure 30 is shown in a before and after sequence showing the battery enclosure 30 enclosing a battery 12 in FIG. 4 in its as-designed condition. FIG. 5 shows the battery enclosure 30 after an impact to the front or rear of the vehicle (not shown). An impact to the front or rear of the vehicle may cause the impact absorbing members on both the front and rear to collapse. The impact to the enclosure on one side may cause the bottom to collapse impact absorbing members on the opposite side.

With reference to FIG. 4, the battery enclosure 30 includes partially cylindrical impact absorbing members 32 on the front wall 38, rear wall 40, right side wall 42 and left side wall 44. As shown in FIG. 4, the top wall 46 is a flat planar member spanning between the walls 38-44. The impact absorbing members 32 include an arc-shaped wall 34 and a flat inner wall 36. The walls 38-44 are joined to adjacent walls at corners 50.

With reference to FIG. 5, the battery enclosure 30 is shown after an impact in the fore/aft direction. The arrow to the right side of FIG. 5 represents the impact force applied to the battery enclosure 30 in a front end collision. It should be noted that the impact force from the front may cause the impact absorbing members 32 on both the front wall 38 and rear wall 40 to collapse. The impact absorbing members 32 on the rear wall 40 may collapse if the battery enclosure 30 is driven rearwardly in the course of the collision impact. The impact absorbing members 32 collapse before the inner flat wall 36 is significantly deformed, as will be described in greater detail below with reference to FIGS. 6A-6E.

Figure 6A:
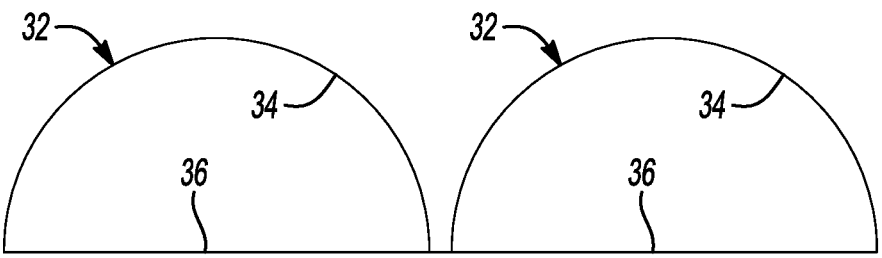
FIGS. 6A-6E are diagrammatic cross-sectional CAD views of two semi-cylindrical impact absorbing members showing a progression as an impact is absorbed beginning with a view of the impact absorbing elements as provided and showing how the elements absorb the impact until the elements are fully collapsed.

Referring to FIG. 6A, two impact absorbing members 32 are shown to include the arc-shaped outer wall 34 and the flat inner wall 36.

Figure 6B:
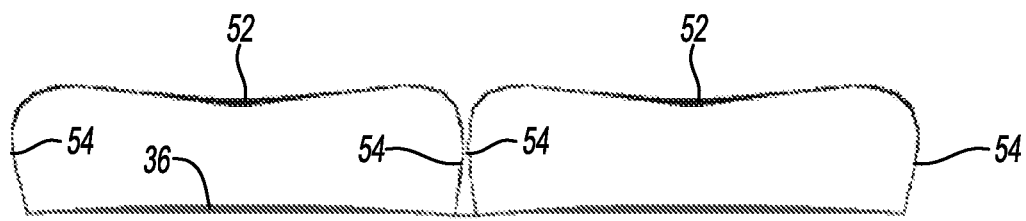

Referring to FIG. 6B, in an early stage of an impact or if the impact is relatively minor, the impact absorbing members 32 are shown to collapse slightly to form a flat face 52 that spans between two side edges 54 of each of the impact absorbing members 32 shown in FIG. 6A.

Figure 6C:

Referring to FIG. 6C, the progress of the impact is shown to create a concave surface 56 as the flat face 52 (shown in FIG. 6B) is driven towards the flat inner wall 36. At this point, the side edges 54 are further deformed, but still remain oriented substantially normal to the flat inner wall 36.

Figure 6D:
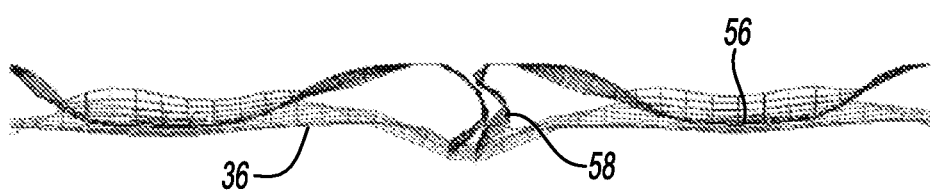
Figure 6E:
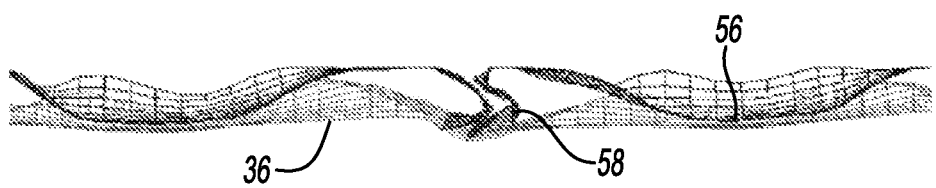

Referring to FIGS. 6D and 6E, the impact is shown to have progressed even further such that the concave surface 56 is driven against the flat inner wall 36, but the side edges 54 are now further deformed and become collapsed portions 58. The depiction in FIG. 6E corresponds to the impact absorbing members 32 shown to be collapsed in FIG. 5 above.

Figure 7:
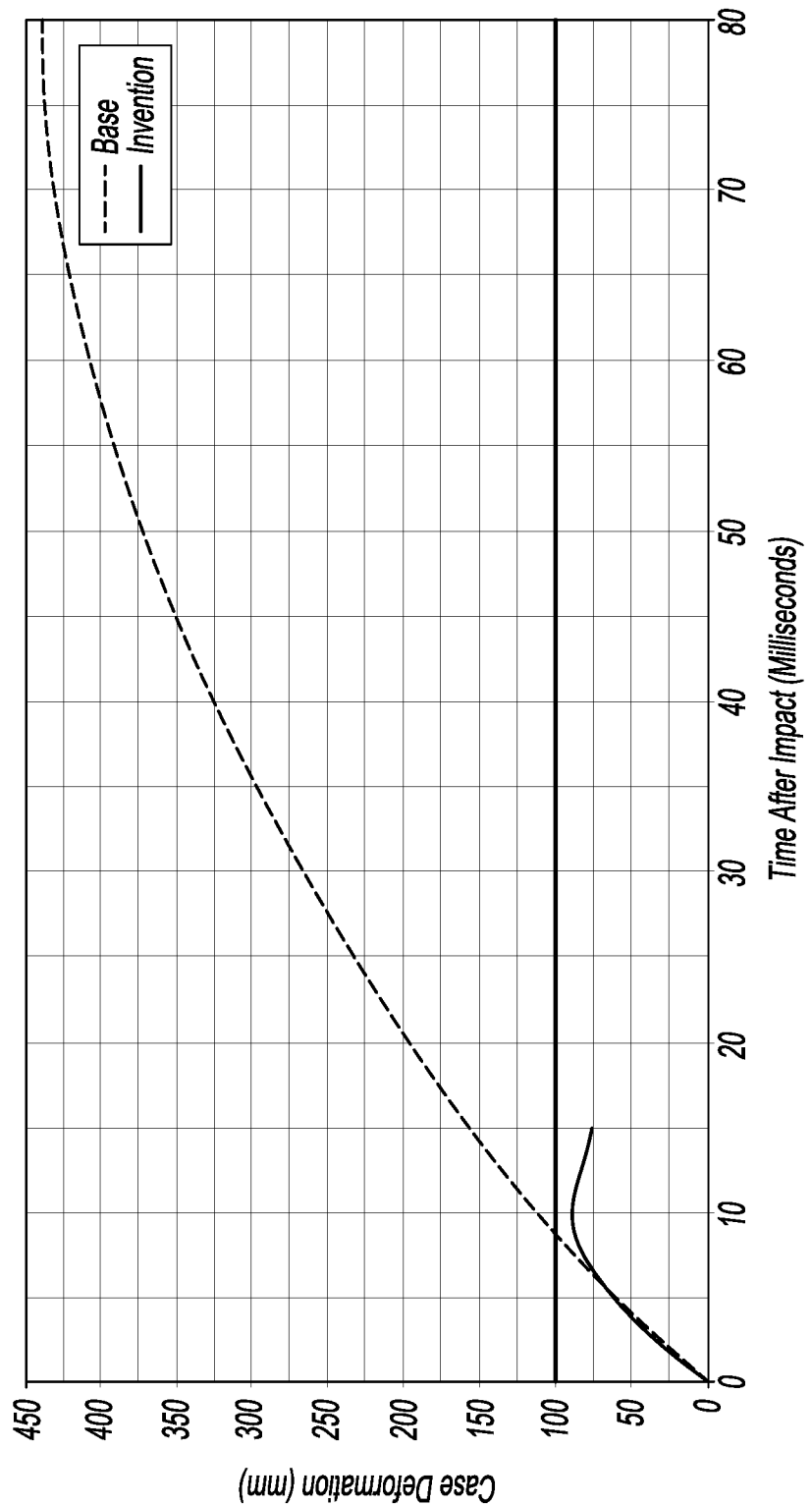
FIG. 7 is a graph of battery case deformation test simulation comparing a base steel battery case without the impact absorbing members to an aluminum battery case made according to FIG. 2 with the impact absorbing members on all sides and the top and bottom thereof.

Referring to FIG. 7, a graph of battery case deformation is provided that compares a base steel battery case without impact absorbing members compared to an aluminum battery case including impact absorbing members made according to this disclosure. The base battery case deformation in the illustrated simulated test is approximately 450 mm over a period of approximately 80 milli-seconds. In comparison, the battery case deformation for the battery enclosure including impact absorbing members illustrated in FIGS. 2-5 is shown to result in an 80% reduction in deformation with the deformation being approximately 90 mm in the 10 milli-seconds from the time of impact. The deformation of the battery enclosure disclosed in this application is less than the 100 mm of deformation that is indicated to be available for crush in the test.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:
1. An enclosure for a battery comprising:
a plurality of side walls disposed about the battery, the side walls each including a plurality of arc-shaped outer wall segments forming half cylinders generated about a vertically extending axis and a flat inner wall that define a plurality of enclosed semi-cylindrical pockets.
2. The enclosure of claim 1 wherein each of the side walls is provided as a one-piece unitary structure.
3. The enclosure of claim 1 wherein each of the side walls is a one piece extruded structure.

4. The enclosure of claim 1 wherein the arc-shaped outer walls absorb an impact applied to the enclosure by deforming and collapsing the arc-shaped outer walls towards the flat inner wall.

5. The enclosure of claim 1 wherein an impact applied to the arc-shaped outer walls initially causes the arc-shaped outer walls to form a flat face extending between two side edges that extend substantially in a direction normal to the flat inner wall.

6. The enclosure of claim 5 wherein the impact applied to the arc-shaped outer walls may continue to be absorbed by driving the flat face into engagement with the flat inner wall, wherein the flat face becomes a concave surface.

7. The enclosure of claim 5 wherein the impact applied to the arc-shaped outer walls may continue to be absorbed by crushing the two side edges to collapse toward the flat inner wall, wherein the side edges become collapsed portions of the impact absorbing members.

8. The enclosure of claim 1 wherein in an impact the arc-shaped outer wall segments are crushed prior to any deformation of the flat inner wall.

9. A method of providing an impact absorbing battery enclosure for a battery of a vehicle having a battery powered traction motor comprising:
   providing a plurality of vertically extending sides that each have a planar wall and a plurality of impact absorbing arc-shaped walls spaced from the planar walls that define a plurality of partially cylindrical pockets, wherein the arc-shaped outer walls are half cylinders that are generated about a vertically extending axis; and
   assembling the plurality of vertically extending sides together about the battery to form an impact absorbing assembly outside the battery.

10. The method of claim 9 further comprising the step of extruding the vertically extending sides to form the planar wall and the plurality of impact absorbing arc-shaped walls.

11. The method of claim 9 wherein the vertically extending sides are formed from an aluminum alloy.

12. The method of claim 9 wherein the vertically extending sides are separately formed and assembled together at four corners of the enclosure.

13. A vehicle comprising:
   a frame;
   a body supported on the frame including a front bumper, a rear bumper, and side walls;
   a traction battery disposed inside the body; and
   an enclosure disposed on the traction battery includes side walls that each have a plurality of arc-shaped outer wall segments forming half cylinders generated about a vertically extending axis parallel to a flat inner wall that define a plurality of semi-cylindrical pockets.

* * * * *